(12) United States Patent
Takaoka et al.

(10) Patent No.: US 12,493,111 B2
(45) Date of Patent: Dec. 9, 2025

(54) ANTENNA DEVICE, DETECTION DEVICE, OPENING/CLOSING UNIT CONTROL SYSTEM, AND OCCUPANT DETECTION SYSTEM

(71) Applicant: Alps Alpine Co., Ltd., Tokyo (JP)

(72) Inventors: Hiroyuki Takaoka, Miyagi-ken (JP); Tomoki Ikeda, Miyagi-ken (JP); Benjamin Uttalveroff, Miyagi-ken (JP); Yuki Kato, Miyagi-ken (JP); Takamitsu Shibayama, Miyagi-ken (JP); Yukio Otaki, Miyagi-ken (JP); Takashi Sano, Miyagi-ken (JP)

(73) Assignee: Alps Alpine Co., Ltd, Tokyo (JP)

( * ) Notice: Subject to any disclaimer, the term of this patent is extended or adjusted under 35 U.S.C. 154(b) by 184 days.

(21) Appl. No.: 18/350,505

(22) Filed: Jul. 11, 2023

(65) Prior Publication Data

US 2023/0350043 A1 Nov. 2, 2023

Related U.S. Application Data

(63) Continuation of application No. PCT/JP2021/042849, filed on Nov. 22, 2021.

(30) Foreign Application Priority Data

Feb. 12, 2021 (JP) .................................. 2021-020998

(51) Int. Cl.
*G01S 13/04* (2006.01)
*H01Q 1/32* (2006.01)
*H01Q 19/13* (2006.01)

(52) U.S. Cl.
CPC ........... *G01S 13/04* (2013.01); *H01Q 1/3233* (2013.01); *H01Q 19/13* (2013.01);
(Continued)

(58) Field of Classification Search
None
See application file for complete search history.

(56) References Cited

U.S. PATENT DOCUMENTS

2018/0170309 A1* 6/2018 McMahon ............ B60Q 1/503
2019/0101634 A1* 4/2019 Baheti ..................... G01S 7/415
(Continued)

FOREIGN PATENT DOCUMENTS

JP 2010-154182 7/2010
JP 2017-34644 2/2017
(Continued)

OTHER PUBLICATIONS

International Search Report from International Application No. PCT/JP2021/042849 dated Feb. 8, 2022.
(Continued)

*Primary Examiner* — Dameon E Levi
*Assistant Examiner* — Anh N Ho
(74) *Attorney, Agent, or Firm* — Beyer Law Group LLP

(57) ABSTRACT

An antenna device includes: a circuit board; an antenna placed on the circuit board; and a reflector that is erected on the circuit board and extends along its surface. The reflector has: a convexly curved portion protruding toward the antenna, the convexly curved portion reflecting radio waves emitted by the antenna; and a first plane portion and second plane portion that extend from both sides of the convexly curved portion along the surface of the circuit board, form a V shape together with the convexly curved portion in plan view, and reflect radio waves emitted by the antenna. The surface of the convexly curved portion has a shape equivalent to a portion on the outer circumferential surface of a cylinder, the portion being the range of an azimuth angle
(Continued)

with respect to a cylindrical axis. The convexly curved portion is inclined toward the antenna with respect to the circuit board.

17 Claims, 23 Drawing Sheets

(52) U.S. Cl.
 CPC ... *E05Y 2900/531* (2013.01); *E05Y 2900/546* (2013.01); *E05Y 2900/548* (2013.01)

(56) References Cited

U.S. PATENT DOCUMENTS

2019/0165452 A1  5/2019  Jeon et al.
2019/0165483 A1  5/2019  Shiozaki et al.

FOREIGN PATENT DOCUMENTS

| JP | 2017-126118 | | 7/2017 | |
| JP | 2019-097119 | | 6/2019 | |
| JP | 2019097119 A | * | 6/2019 | ........... G01S 13/931 |
| WO | WO-2018003345 A1 | * | 1/2018 | ............. B60N 2/002 |
| WO | WO-2020234589 A1 | * | 11/2020 | ............. H01Q 1/246 |

OTHER PUBLICATIONS

European Search Report dated Dec. 2, 2024 from European Application No. 21925114.7.

* cited by examiner

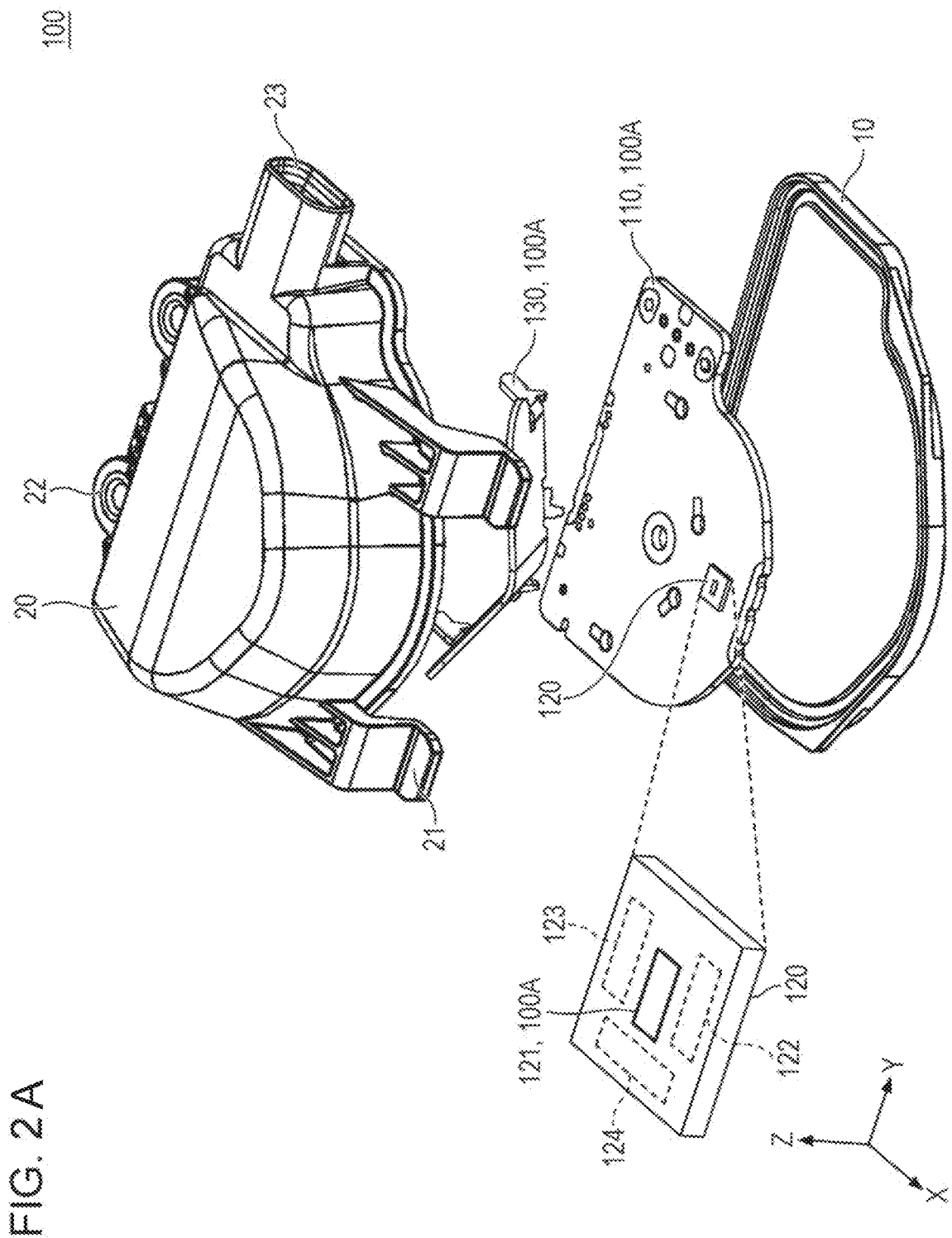

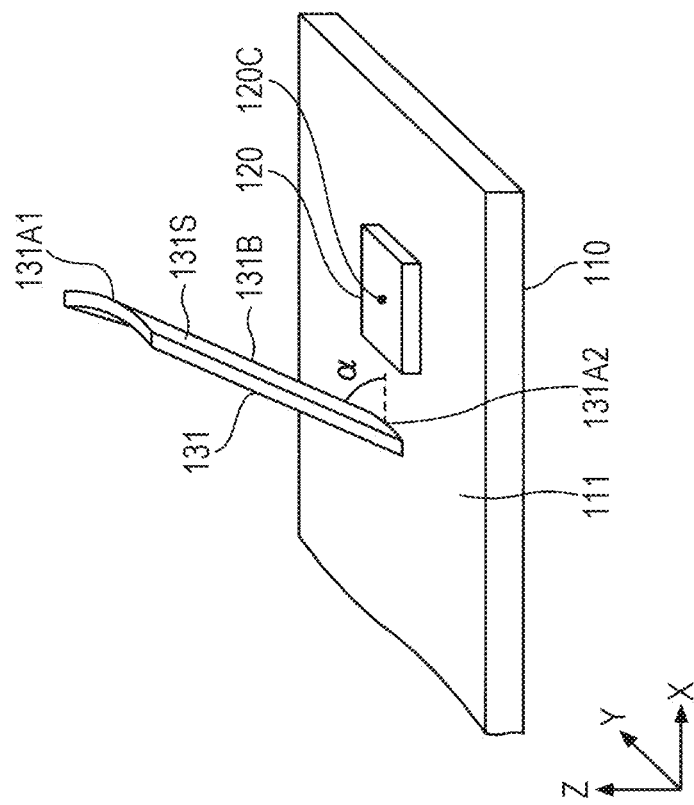
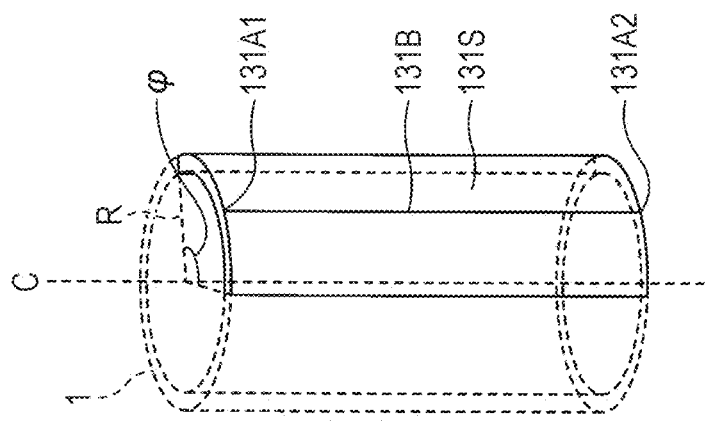

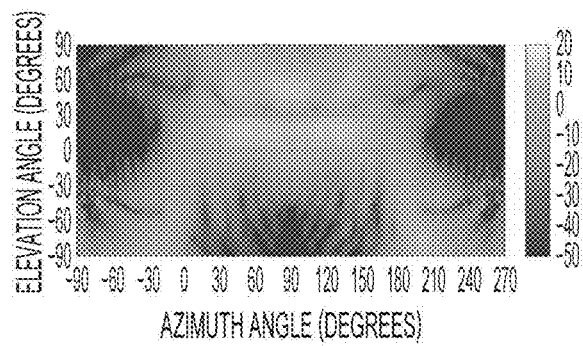
FIG. 11A
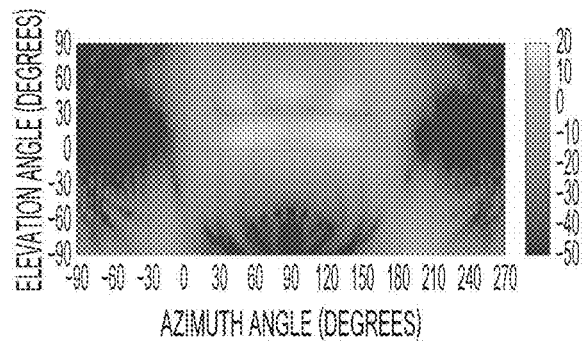
FIG. 11B
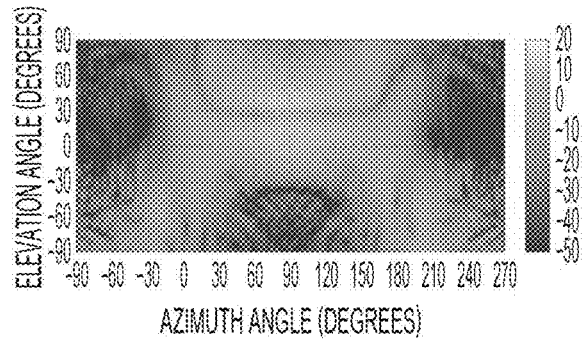
FIG. 11C
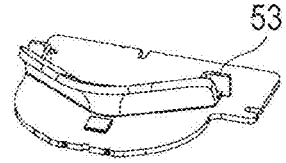

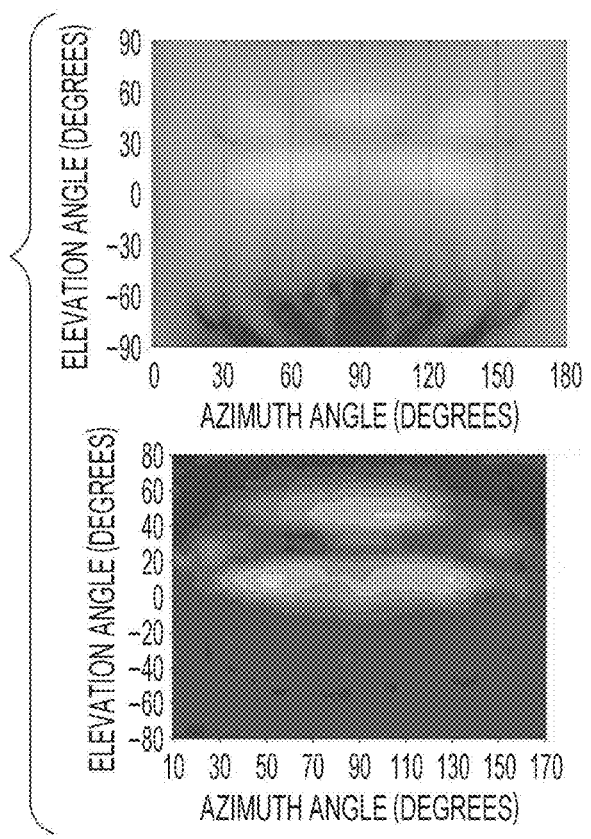

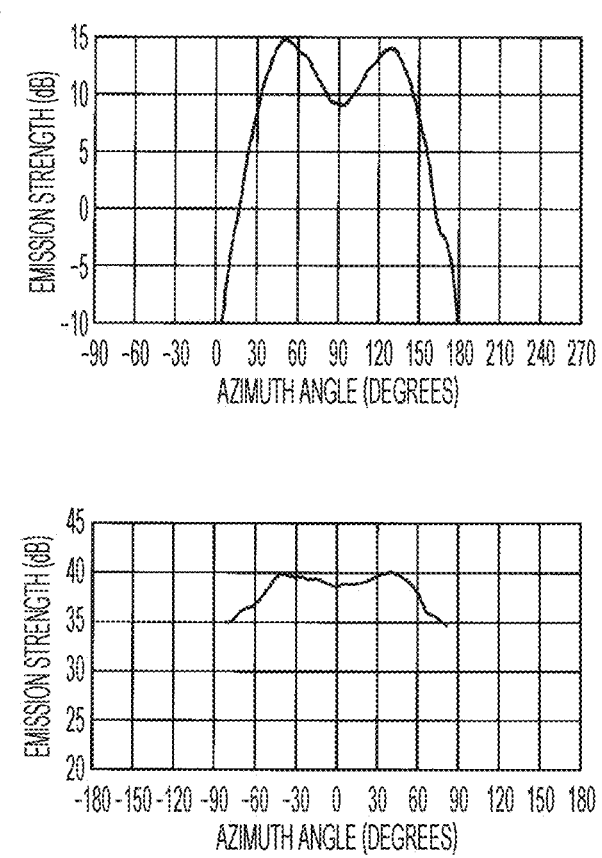

ANTENNA DEVICE, DETECTION DEVICE, OPENING/CLOSING UNIT CONTROL SYSTEM, AND OCCUPANT DETECTION SYSTEM

CLAIM OF PRIORITY

This application is a Continuation of International Application No. PCT/JP2021/042849 filed on Nov. 22, 2021, which claims benefit of Japanese Patent Application No. 2021-020998 filed on Feb. 12, 2021. The entire contents of each application noted above are hereby incorporated by reference.

BACKGROUND OF THE INVENTION

1. Field of the Invention

The present invention relates to an antenna device, a detection device, an opening/closing unit control system, and an occupant detection system.

2. Description of the Related Art

A conventional vehicle-mounted radar device has a millimeter-wave radar and a reflecting mirror that reflects transmission and reception waves of the millimeter-wave radar. The reflecting mirror is a half-truncated cone body the radius of which is longer than the height. A side surface of the half-truncated cone body is a reflecting surface. The reflecting surface is a concavely curved surface formed by curving the generating line of the truncated cone toward the bottom face (Japanese Unexamined Patent Application Publication No. 2010-154182, for example).

From the viewpoint of designing a reflecting surface so that a superior distribution of reflected waves is obtained, when the generating line of a half-truncated cone body is curved toward the bottom face as with the reflecting surface of the reflecting mirror included in the conventional vehicle-mounted radar device, the resulting reflecting surface has a complex shape and is not easily designed.

The present invention provides an antenna device having a reflector that has a simple structure and is easy to design, a detection device, an opening/closing control system, and an occupant detection system.

SUMMARY OF THE INVENTION

An antenna device in an embodiment of the present invention includes: a circuit board; an antenna placed on a surface of the circuit board; and a reflector that is erected on the surface of the circuit board and extends along the surface. The reflector has: a curved portion that has a convexly curved surface, which is curved at a certain curvature and protrudes toward the antenna, the convexly curved surface reflecting radio waves emitted by the antenna; and a first plane portion and a second plane portion that respectively have a first reflecting surface and a second reflecting surface that extend from both side portions of the convexly curved surface, one reflecting surface from each side, along the surface of the circuit board, form a V shape together with the convexly curved surface in plan view, and reflect radio waves emitted by the antenna. The convexly curved surface has a shape equivalent to a portion on the outer circumferential surface of a cylinder, the portion being the range of a certain azimuth angle with respect to a cylindrical axis. The convexly curved surface is inclined toward the antenna with respect to the circuit board.

It is possible to provide an antenna device having a reflector that has a simple structure and is easy to design, a detection device, an opening/closing control system, and an occupant detection system.

BRIEF DESCRIPTION OF THE DRAWINGS

FIG. 2A is an exploded view of the detection device,
FIGS. 7A and 7B each illustrate a curved portion;
FIGS. 11A to 11C illustrate simulation results for emission strength of the detection device;
FIGS. 13A to 13C illustrate emission strength of the detection device;
FIGS. 14A to 14C illustrate actual measurement results for the characteristics of emission strength with respect to the azimuth angle of the detection device.

DESCRIPTION OF THE PREFERRED EMBODIMENTS

An embodiment to which an antenna device, a detection device, an opening/closing unit control system, and an occupant detection system in the present invention are applied will be described below. The description below is based on an XYZ coordinate system. An X direction parallel to the X axis, a Y direction parallel to the Y axis, and a Z direction parallel to the Z axis are mutually orthogonal. In the description below, the −Z-direction side may be referred to as the lower side or bottom, and the +Z-direction side may be referred to as the upper side or top, for convenience of explanation. The phrase "in plan view" will refer to an XY plane being viewed. In the description below, for easy understanding of the structure, the length, bulkiness, thickness, and the like of each portion may be indicated by being exaggerated. The terms "parallel", "above", "below", and other similar words will allow incorrectness to the extent that effects of the embodiment are not lost.

Embodiment

Figure 1:
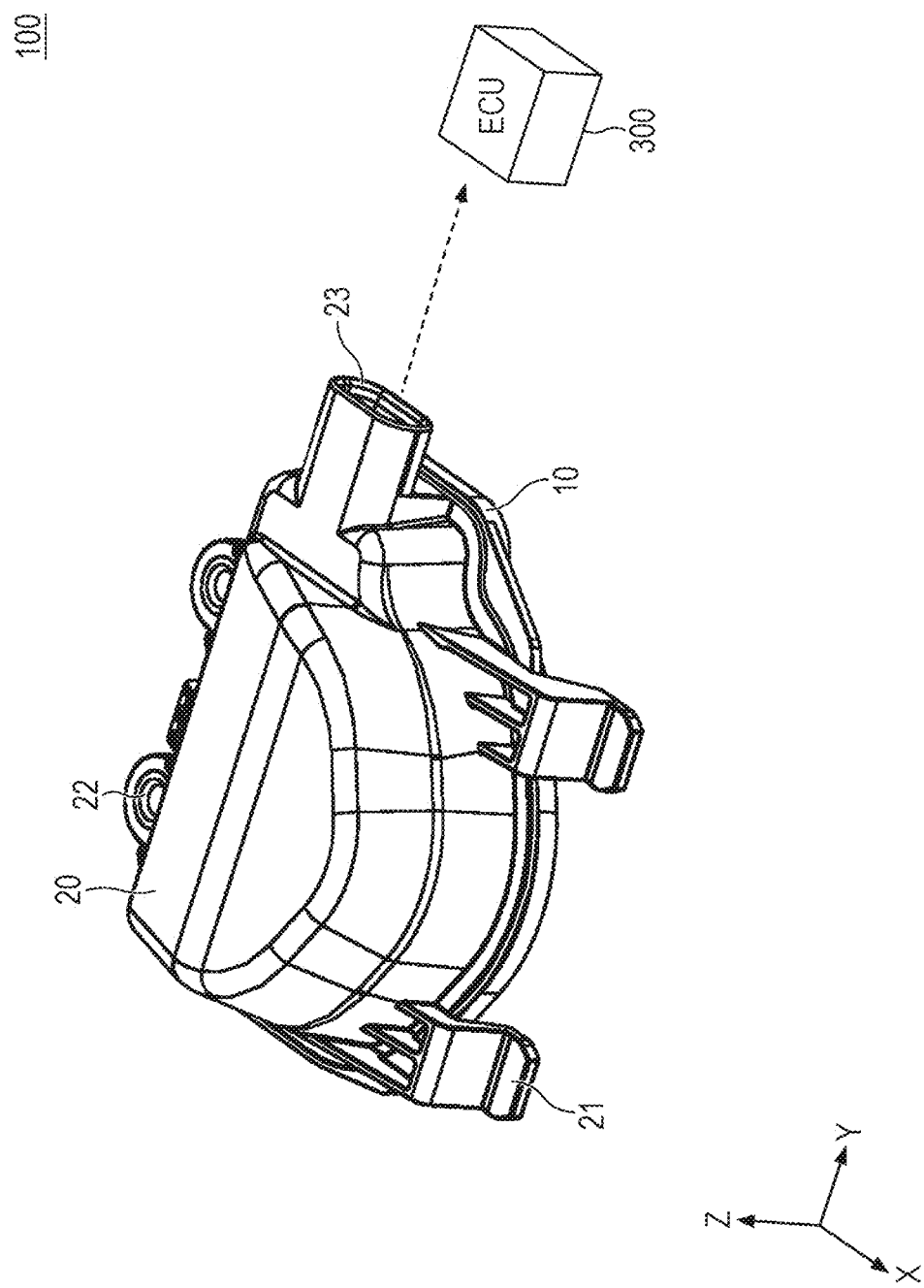
FIG. 1 illustrates a detection device in an embodiment.

FIG. 1 illustrates a detection device 100 in an embodiment. In FIG. 1, an electronic control unit (ECU) 300 is also illustrated. FIG. 2 is an exploded view of the detection device 100. The detection device 100 includes a lower case 10, an upper case 20, a circuit board 110, a transmission and reception device 120, and a reflector 130. The transmission and reception device 120 has an antenna 121, a transmission circuit 122, a reception circuit 123, and a control unit 124.

The detection device 100 includes at least the circuit board 110, transmission and reception device 120, and reflector 130. An antenna device 100A in the embodiment includes at least the circuit board 110, antenna 121, and reflector 130. In FIG. 2, therefore, the reference characters 100A are also indicated in parentheses for the circuit board 110, antenna 121, and reflector 130.

When the lower case 10 and upper case 20, which are an example of a cabinet, are aligned and engaged together, they form a case having a sealed internal space. In the internal space in the case formed with the lower case 10 and upper case 20, the circuit board 110, transmission and reception device 120, and reflector 130 are stored. With the detection device 100, the circuit board 110, transmission and reception device 120, and reflector 130 are thus packaged by being stored in the lower case 10 and upper case 20.

As an example, the upper case 20 has engagement portions 21, screw holes 22, and a connector 23. The engagement portions 21 and screw holes 22 are an example of an attachment portion by which the case formed with the lower case 10 and upper case 20 can be attached at a lower portion of a door of a vehicle, inside the bumper, or in the interior of the room of the vehicle. The connector 23 has terminals to be connected to the transmission and reception device 120 through the circuit board 110. The connector 23 is connected to the ECU 300 in the vehicle through, for example, the Local Interconnect Network (LIN) or Controller Area Network (CAN) used in the vehicle. Thus, the detection device 100 is connected to the ECU 300 through the connector 23.

As an example, this type of detection device 100 can be used as a device that detects the operation of an electric opener for an opening/closing portion of the trunk lid, the rear gate, a slide door, or the like of a vehicle. In this case, the detection device 100 detects the presence or motion of the toes of the user of the vehicle below the rear bumper. The user who places the toes below the rear bumper is an example of a manipulator present in the vicinity of a vehicle.

The electric opener is a device that unlocks a lock and drives an actuator that opens and closes an opening/closing portion of a trunk lid, a rear gate, a slide door, or the like. When the ECU 300 is a control unit that controls the opening and closing of an opening/closing portion of a vehicle according to the result of detection by the detection device 100, a system including the detection device 100 and ECU 300 is an opening/closing control system. When the ECU 300 is an occupant detection unit that detects the presence or absence of an occupant in the room of a vehicle according to the result of detection by the detection device 100, a system including the detection device 100 and ECU 300 is an occupant detection system.

When the detection device 100 is used as a device that detects the operation of an electric opener for the trunk lid or rear gate of a vehicle, the detection device 100 is disposed, as an example, inside the rear bumper of the vehicle at the center in the width direction of the vehicle. In this case, the +X direction is the vertically downward direction, the −X direction is the vertically upward direction, the +Y direction is on the right side in the travel direction of the vehicle, the −Y direction is on the left side in the travel direction of the vehicle, the +Z direction is the backward of the vehicle, and the −Z direction is the forward of the vehicle. The detection device 100 emits radio waves in the +X direction and receives reflected waves to detect the presence or behavior of a detection target in the +X direction.

An aspect will be described below in which, as an example, the detection device 100 is disposed inside the rear bumper of a vehicle to detect the presence or motion of the toes of the user who is going to operate the electric opener of the trunk lid or rear gate. That is, in the description below, the detection target of the detection device 100 is the toes of the user, as an example.

The detection device 100 detects the presence or behavior of the detection target in the +X direction by emitting radio waves in the +X direction and receiving reflected waves. A timing to receive a reflected wave differs depending on whether or not the toes of the user, which are the detection target, are present below the detection device 100. Therefore, the detection device 100 detects at least one of the presence of the toes and a behavior in which the toes have been placed below the detection device 100.

Next, the structures of the circuit board 110, transmission and reception device 120, and reflector 130 will be described in details with reference to FIGS. 3 to 6, in addition to FIGS. 1 and 2. FIGS. 3 to 6 illustrate the detection device 100 and antenna device 100A. In FIGS. 3 to 6, the circuit board 110, transmission and reception device 120, and reflector 130 are illustrated.

Figure 2B:
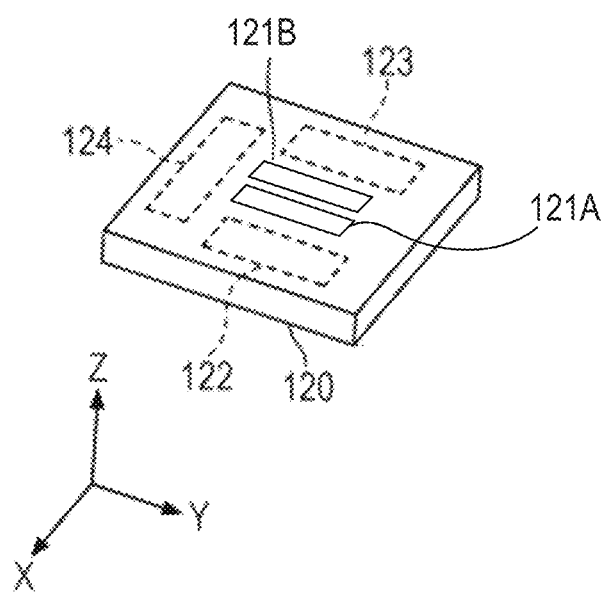
FIG. 2B illustrates another example of the antenna.
Figure 3:
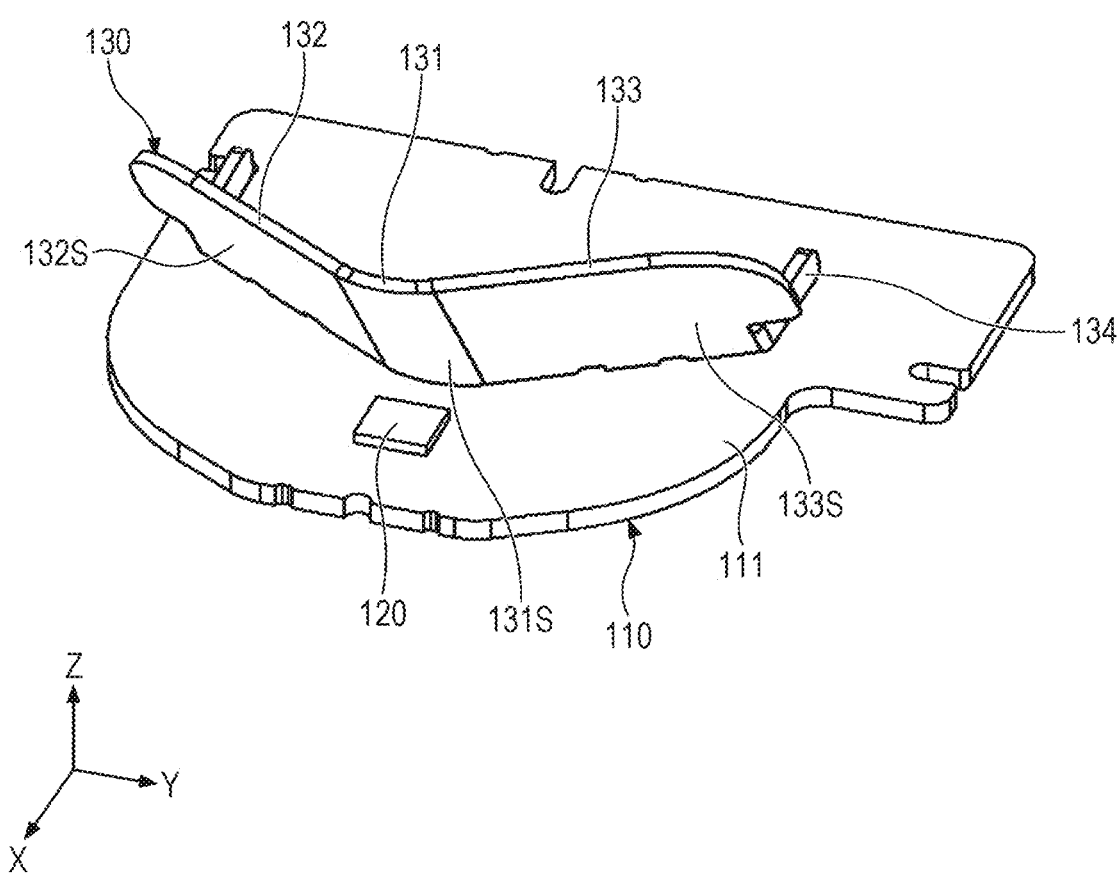
FIG. 3 illustrates the detection device and an antenna device.
Figure 4:
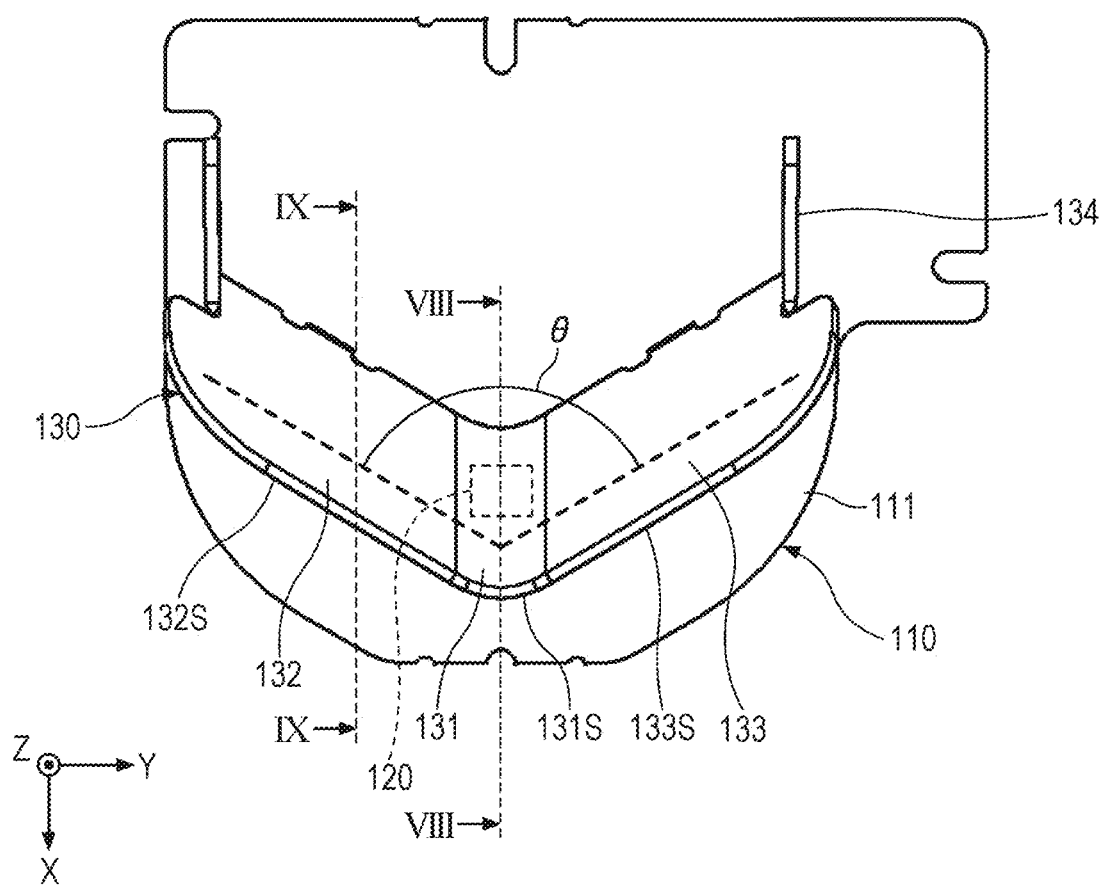
FIG. 4 illustrates the detection device and antenna device.

The circuit board 110 has a shape matching the shapes of the lower case 10 and upper case 20 in plan view, as illustrated in FIGS. 2 to 4. The circuit board 110 is, for example, is a wiring board complying with the Flame Retardant type 4 (FR4) standard or the like. The transmission and reception device 120 and reflector 130 are mounted on the upper surface 111 of the circuit board 110. The control unit 124 (see FIG. 2) of the transmission and reception device 120 is connected to the terminals of the connector 23 (see FIGS. 1 and 2) through wires on the circuit board 110. The circuit board 110 is fixed in the interior of the upper case 20 with screws or the like, as an example.

The transmission and reception device 120 has the antenna 121, transmission circuit 122, reception circuit 123, and control unit 124 as illustrated in an enlarged view in FIG. 2, and is mounted on the upper surface 111 of the circuit board 110 as illustrated in FIGS. 2 to 6. The transmission circuit 122, reception circuit 123, and control unit 124 in the transmission and reception device 120 are implemented as a so-called integrated circuit (IC) chip.

The antenna 121 is disposed on the upper surface of the IC chip and is connected to the transmission circuit 122 and reception circuit 123. An example of the antenna 121 is a patch antenna. The antenna 121 may double as a transmission antenna for transmitting radio waves and a reception antenna for receiving radio waves. The antenna 121 can transmit and receive millimeter-waves at 60.5 GHz, as an example.

The transmission circuit 122 and reception circuit 123 may be integrally formed in an analog integrated circuit included in the IC chip. The transmission circuit 122 and reception circuit 123 are connected to the control unit 124, and their operations are controlled by the control unit 124. The transmission circuit 122 outputs a transmission signal to the antenna 121 in response to a transmission command output from the control unit 124. The reception circuit 123 receives a reflected wave resulting from reflection of a transmission signal at the detection target.

The control unit 124 represents functions implemented by a computer included in the IC chip. The control unit 124 has functions used as a detection unit that detects at least one of the presence and behavior of the detection target according to a signal received by the reception circuit 123.

The reflector 130 is erected on the upper surface 111 of the circuit board 110 as illustrated in FIGS. 3 to 6. Erection on the upper surface 111 refers to provision in an erected state on the upper surface 111 or provision in a standing state on the upper surface 111. The reflector 130 is disposed so as to be inclined with respect to the upper surface 111, as will be described later in detail.

The reflector 130 has a curved portion 131, flat plate portions 132 and 133, fixing portions 134, and engaging portions 135. The flat plate portion 132 is an example of a first plane portion, and the flat plate portion 133 is an example of a second plane portion. The curved portion 131 and flat plate portions 132 and 133 extend along the upper surface 111 of the circuit board 110. The reflector 130 reflects radio waves emitted by the antenna 121 toward the +X-direction side. The reflector 130 also reflects radio waves reflected on the detection target toward the antenna 121.

Since the reflector 130 is disposed in the interior of the rear bumper of the vehicle at the center of the width direction of the vehicle, the reflector 130 demanded to enable the reflected wave to reach a farther distance in a lower left direction and lower right direction of the rear bumper of the vehicle. This is to enable the toes of the user to be detected in a wider range in the left-right direction.

When a toe is at a lower left position or at a lower right position, the distance from the reflector 130 to the toe is longer than when the toe is positioned immediately below the reflector 130. Therefore, the reflector 130 is structured so that it can reflect radio waves farther in a lower left direction, which is on the −Y-direction side in the +X direction and in a lower right direction, which is on the +Y-direction side in the +X direction.

To prolong the reach distance on the −Y-direction side in the +X direction (in a lower left direction) and on the +Y-direction side in the +X direction (in a lower right direction), highly precise design to prolong the reach distance is demanded to be possible. To achieve this, the reflector 130 of the antenna device 100A and detection device 100 in this embodiment has a relatively simple structure.

The curved portion 131 has a convexly curved surface 131S, which is curved at a certain curvature and protrudes toward the transmission and reception device 120 having the antenna 121 (see FIG. 2). The convexly curved surface 131S is the reflecting surface of the curved portion 131. The curved portion 131 may have a shape in which a flat plate is curved. The convexly curved surface 131S has a shape equivalent to a portion on the outer circumferential surface of a cylinder, the portion being the range of a certain azimuth angle with respect to a cylindrical axis. The curved portion 131 is inclined toward the transmission and reception device 120 having the antenna 121 (see FIG. 2), with respect to the upper surface 111 of the circuit board 110.

Figure 8:
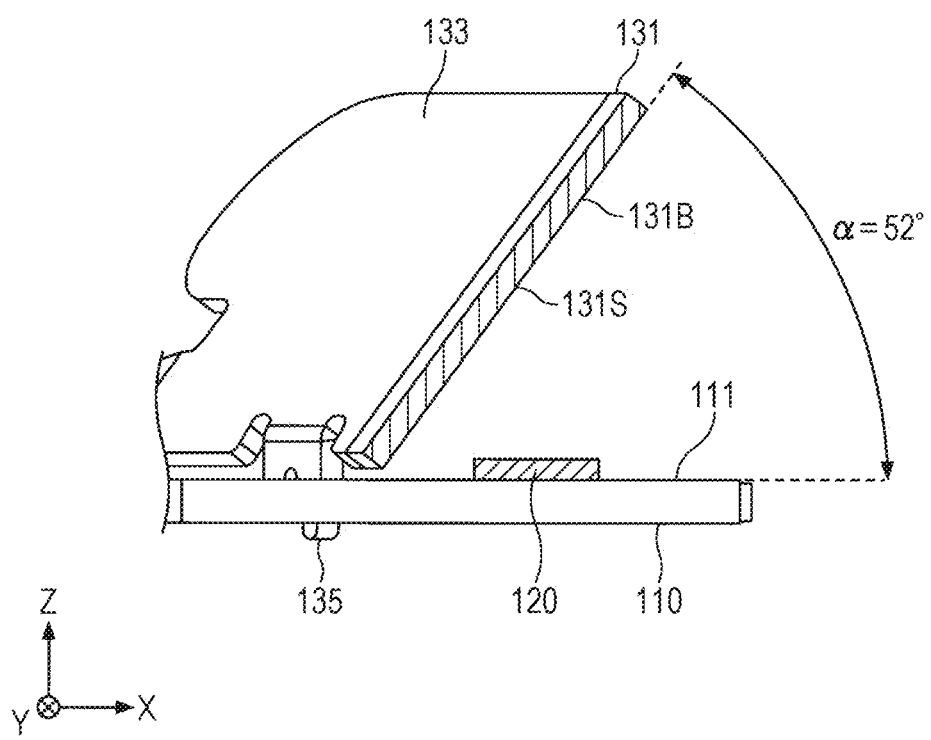
FIG. 8 illustrates a cross section along line VIII-VIII in FIG. 4.
Figure 9:
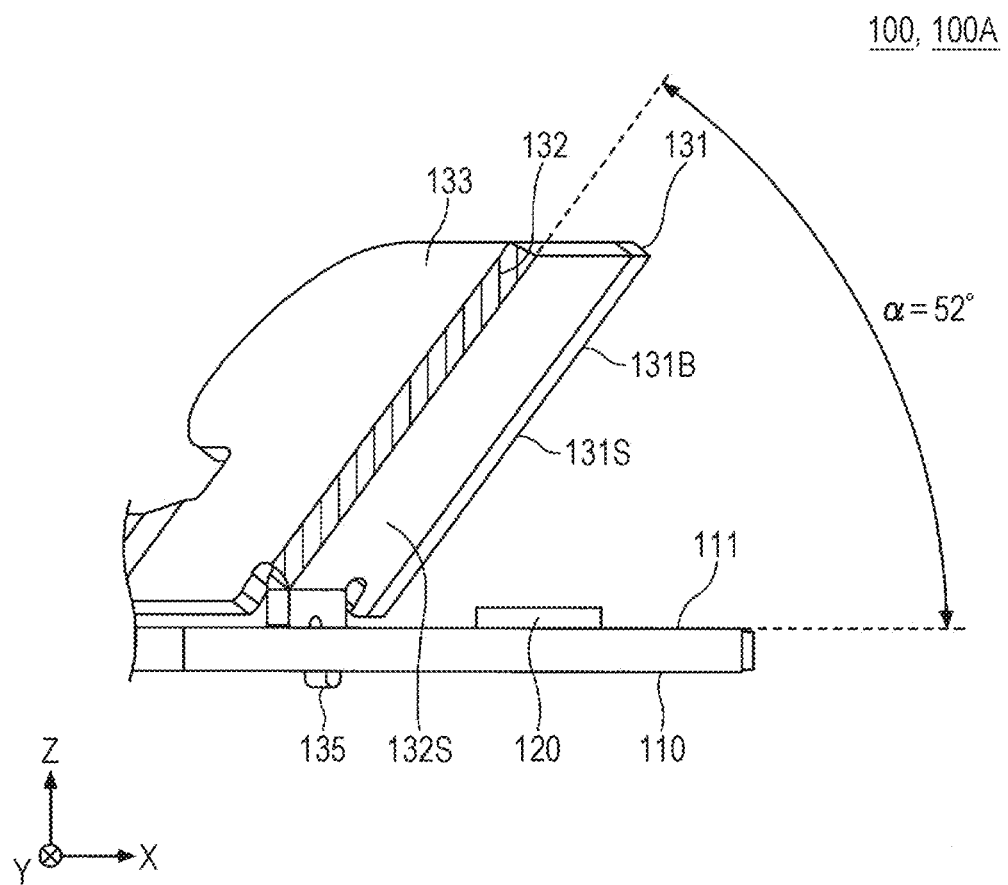
FIG. 9 illustrates a cross section along line IX-IX in FIG. 4.

Now, the shape of the curved portion 131 will be described with reference to FIGS. 7 to 9 besides FIGS. 3 to 6. FIGS. 7A and 7B each illustrate the curved portion 131. In FIGS. 7A and 7B, only the curved portion 131 is extracted from the reflector 130. In FIG. 7A, a cylinder 1 including the curved portion 131, the cylinder 1 being vertical, is illustrated. FIG. 8 illustrates a cross section along line VIII-VIII in FIG. 4. FIG. 9 illustrates a cross section along line IX-IX in FIG. 4.

As illustrated in FIG. 7A, the curved portion 131 is a portion on the cylinder 1 having a radius vector R and a cylindrical axis C, the portion being the range of an azimuth angle φ with respect to the cylindrical axis C. The azimuth angle φ is an example of a certain azimuth angle. The curved portion 131 has a vertex 131A1 of an arc, the vertex 131A1 being at the upper end of the convexly curved surface 131S, a vertex 131A2 of the arc, the vertex 131A2 being at the lower end of the convexly curved surface 131S, and a straight line 131B linking the vertex 131A1 and vertex 131A2 together. The straight line 131B is positioned on the convexly curved surface 131S and is parallel to the cylindrical axis C. The straight line 131B is equivalent to the generating line of the cylinder 1.

As illustrated in FIG. 7B, the curved portion 131 is placed on the upper surface 111 so that the straight line 131B linking the vertex 131A1 and vertex 131A2 together is positioned on a plane parallel to an XZ plane and passing through the center 120C of the upper surface of the transmission and reception device 120 and that the straight line 131B is inclined toward the transmission and reception device 120. Since the straight line 131B is inclined toward the transmission and reception device 120, the convexly curved surface 131S is also inclined toward the transmission and reception device 120. The center 120C is equivalent to the center of the surface of the antenna 121 (see FIG. 2).

The curved portion 131 is inclined so that the angle formed by the upper surface 111 and the straight line 131B linking the vertex 131A1 and vertex 131A2 together becomes an angle α on a plane parallel to an XZ plane and passing through the center 120C of the transmission and reception device 120. Although the convexly curved surface 131S is shaped so that the convexly curved surface 131S is curved in the circumferential direction as with the outer circumferential surface of the cylinder 1, but is not curved in a direction parallel to the cylindrical axis C and straight line 131B.

In this embodiment, the angle α is 52 degrees as an example, as illustrated in FIG. 8. This type of curved portion 131 is relatively easy to design. The curved portion 131 can be manufactured by bending a flat plate to a radius R of curvature along the cylindrical axis C, which is vertical. The angle α is not limited to 52 degrees. The angle α is an acute angle (an angle greater than 0 degree and smaller than 90 degrees).

As illustrated in FIG. 4, the curved portion 131 overlaps the transmission and reception device 120 in plan view, as an example. In the drawing, an aspect is illustrated in which the curved portion 131 overlaps the whole of the transmission and reception device 120. However, the curved portion 131 preferably overlaps at least part of the transmission and reception device 120 in plan view. This is because radio waves emitted from the antenna 121 (see FIG. 2) of the transmission and reception device 120 can be efficiently reflected. When, for example, the antenna 121 emits radio waves toward the curved portion 131 with respect to the vertically upward direction, the curved portion 131 may not overlap the transmission and reception device 120 in plan view.

Figure 5:
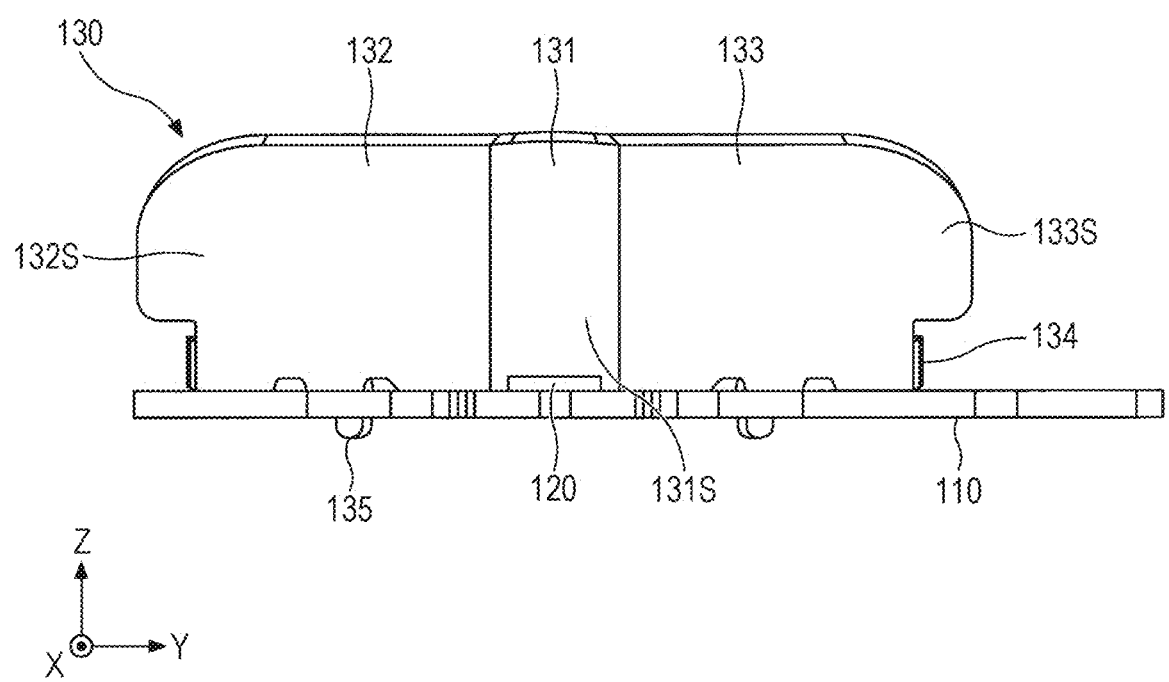
FIG. 5 illustrates the detection device and antenna device.
Figure 6:
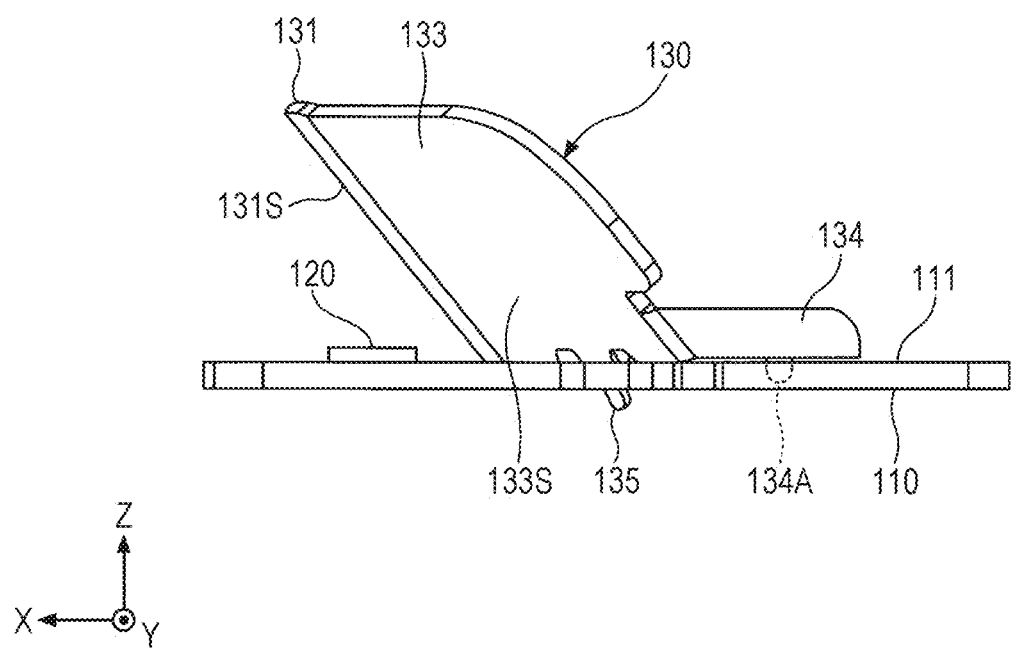
FIG. 6 illustrates the detection device and antenna device.

Both of the flat plate portions 132 and 133 have a flat plate shape (plate-like), and respectively have surfaces 132S and 133S on the +X-direction side, as illustrated in FIGS. 3, 5, and 6. The surface 132S is the reflecting surface of the flat plate portion 132, and the surface 133S is the reflecting surface of the flat plate portion 133. The surface 132S is an example of a first reflecting surface, and the surface 133S is an example of a second reflecting surface.

The surface 132S extends from one of both side portions of the convexly curved surface 131S in the circumferential direction along the upper surface 111 of the circuit board 110. Similarly, the surface 133S extends from the other of both side portions along the upper surface 111. The surfaces 132S and 133S form a V shape together with the convexly curved surface 131S in plan view as illustrated by the broken lines in FIG. 4. The angle (interior angle) θ of the V shape formed by the surfaces 132S and 133S is 120 degrees, as an example. The angle θ is preferably greater than or equal to 90 degrees.

The flat plate portion 132 is disposed so as to continuous from the side portion of the curved portion 131 on the −Y-direction side in the circumferential direction. Similarly, the flat plate portion 133 is disposed so as to continuous from the side portion of the curved portion 131 on the +Y-direction side in the circumferential direction. Therefore, the surface 132S may be continuous from the end of the convexly curved surface 131S on the −Y-direction side, and the surface 133S may be continuous from the end of the convexly curved surface 131S on the +Y-direction side.

Therefore, when the cross section of the flat plate portion 132 as taken along a plane parallel to an XZ plane is viewed as illustrated in FIG. 9, the angle formed by the surface 132S and upper surface 111 is a, so the angle is equal to the angle α formed by the upper surface 111 and the straight line 131B of the curved portion 131. This is because in an XZ plane, the flat plate portion 132 is inclined at the same angle as the curved portion 131 with respect to the upper surface 111. Here, the angle α is 52 degrees, as an example.

The flat plate portion 132 and flat plate portion 133 form a symmetric shape (plane symmetry), in which they are mutual mirror images, with respect to a plane that includes the straight line 131B of the curved portion 131 and is parallel to an XZ plane. Therefore, when the cross section of the flat plate portion 133 as taken along a plane parallel to an XZ plane is viewed, the angle formed by the surface 133S and upper surface 111 is a, so the angle is equal to the angle α formed by the upper surface 111 and the straight line 131B of the curved portion 131.

The two fixing portions 134 are a portion extending from an end of the flat plate portion 132 on the −Y-direction side and a portion extending from an end of the flat plate portion 133 on the +Y-direction side. The fixing portions 134 extend in the −X direction. Each fixing portion 134 has a convex portion 134A (see FIG. 6) protruding downward stably to fix the reflector 130 on the upper surface of the circuit board 110. The convex portion 134A is inserted into a through-hole extending through the circuit board 110 in the thickness direction (Z direction), and is fixed to the circuit board 110 with an adhesive or the like.

The two engaging portions 135 are a portion extending from the lower end of the flat plate portion 132 and a portion extending from the lower end of the flat plate portion 133. Each engaging portion 135 is inserted into a through-hole extending through the circuit board 110 in the thickness direction (Z direction), and is fixed to the circuit board 110 with an adhesive or the like.

With the reflector 130 as described above, a direction in which the +X direction is viewed from the vertexes 131A1 and 131A2 in plan view is the direction in which the front of the reflector 130 is oriented and is the direction in which the fronts of the antenna device 100A and detection device 100 are oriented.

The reflector 130 having the curved portion 131, flat plate portions 132 and 133, fixing portions 134, and engaging portions 135 as described above can be manufactured by, for example, performing punching processing to stamp a sheet metal and then bending the resulting metal plate to the radius R of curvature along the cylindrical axis C, which is vertical. The metal plate may be made of, for example, aluminum.

Figure 10:
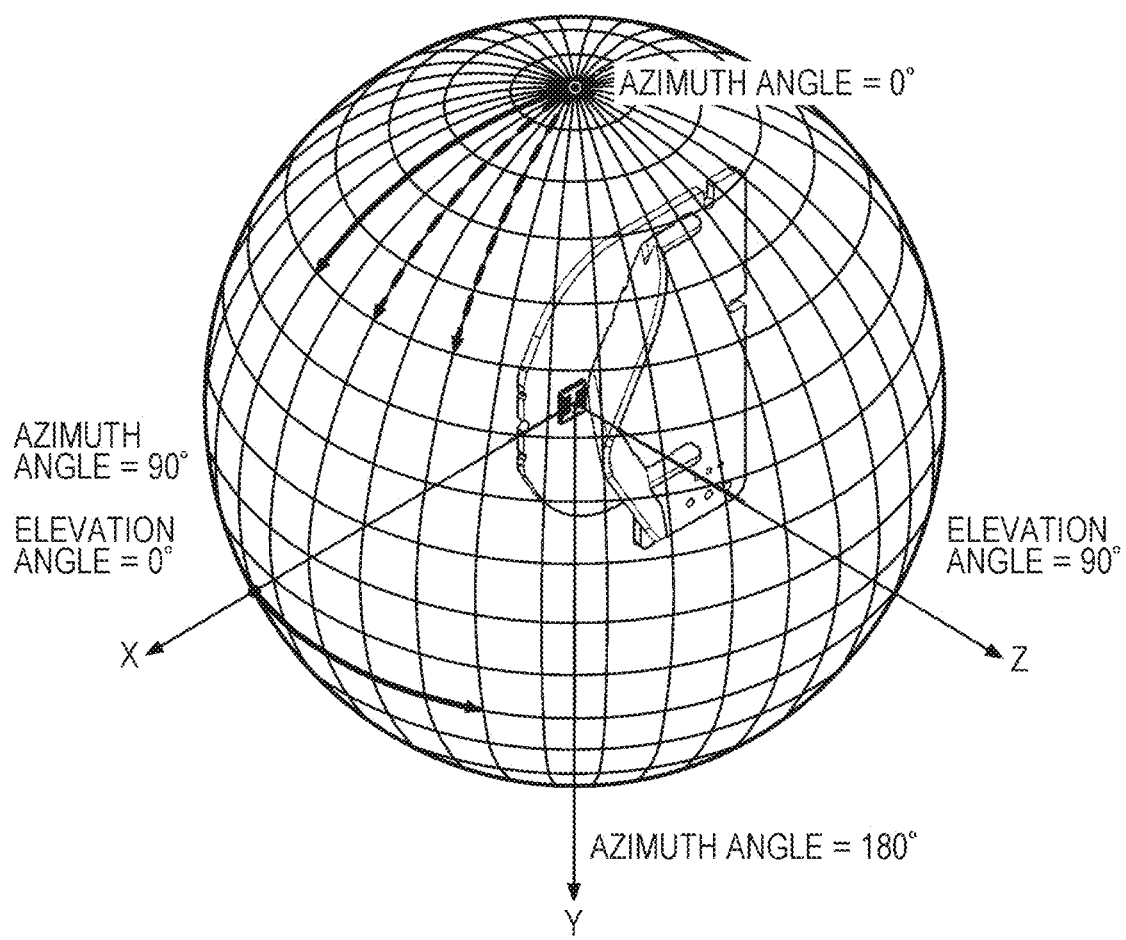
FIG. 10 illustrates an evaluation coordinate system for the detection device.

FIG. 10 illustrates an evaluation coordinate system for the detection device 100. Since the detection device 100 includes the antenna device 100A, results of evaluation by the detection device 100 will be described below. In the description below, it will be assumed that, as illustrated in FIG. 10, the XYZ coordinate system is the same as the XYZ coordinate system illustrated in FIGS. 1 to 9 and that the origin matches the center 120C (see FIG. 7B) on the upper surface of the transmission and reception device 120.

The evaluation coordinate system is a polar coordinate system. The azimuth angle is an angle in a direction illustrated by an arrow with the −Y direction taken as a reference (0 degree). Therefore, the azimuth angle in the +X direction is 90 degrees and the azimuth angle in the +Y direction is 180 degrees. The azimuth angle in the −X direction is 270 degrees and is also −90 degrees. The elevation angle is an angle in a direction illustrated by an arrow with the +X direction taken as a reference (0 degree). Therefore, the elevation angle in the +Z direction is 90 degrees and the azimuth angle in the −Z direction is −90 degrees.

FIGS. 11A to 11C illustrate simulation results for emission strength of the detection device 100. In FIGS. 11A to 11C, the horizontal axis indicates the azimuth angle (in degrees) and the vertical axis indicates the elevation angle (in degrees). FIGS. 11A to 11C represent that the brighter the color is, the higher emission strength is, and that the darker the color is, the lower emission strength is. A detection device 50 for comparison purposes is also illustrated below the simulation result of emission strength in FIG. 11C. The detection device 50 for comparison purposes has a reflector 53, the reflecting surface of which is parabolic, the reflecting surface being equivalent to the convexly curved surface 131S of the curved portion 131 of the reflector 130 and to the surfaces 132S and 133S of the flat plate portions 132 and 133 of the reflector 130.

Figure 12A:
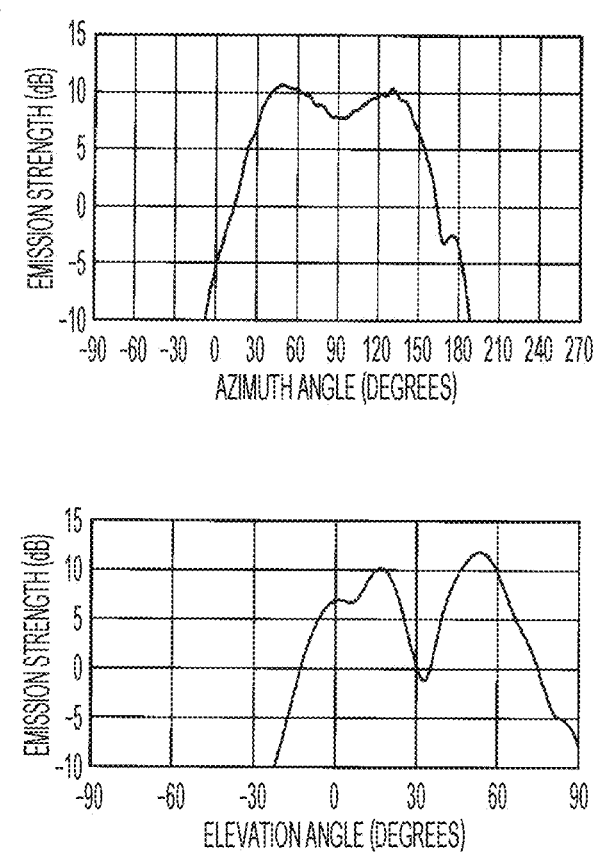
FIGS. 12A to 12C illustrate simulation results for emission strength of the detection device.
Figure 12B:
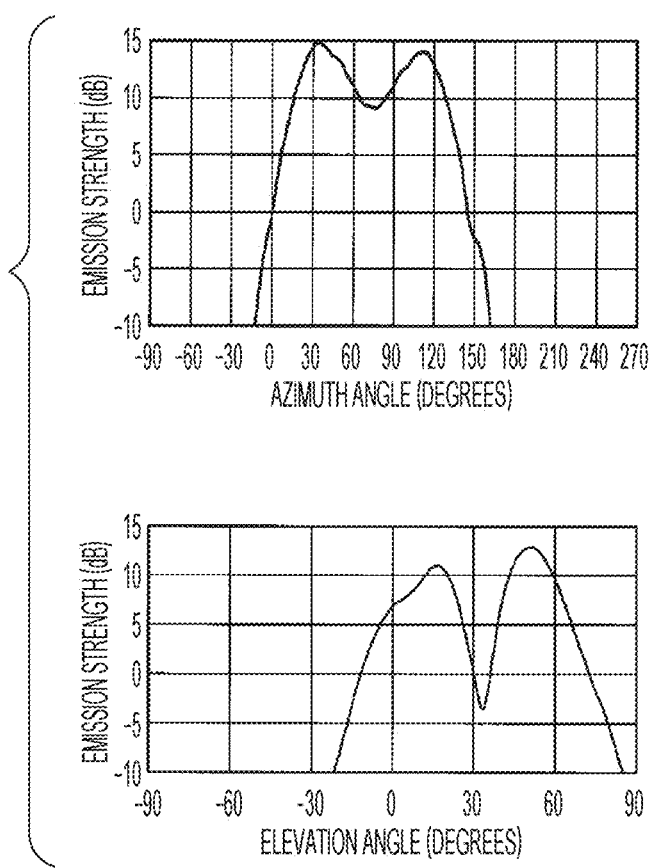
Figure 12C:
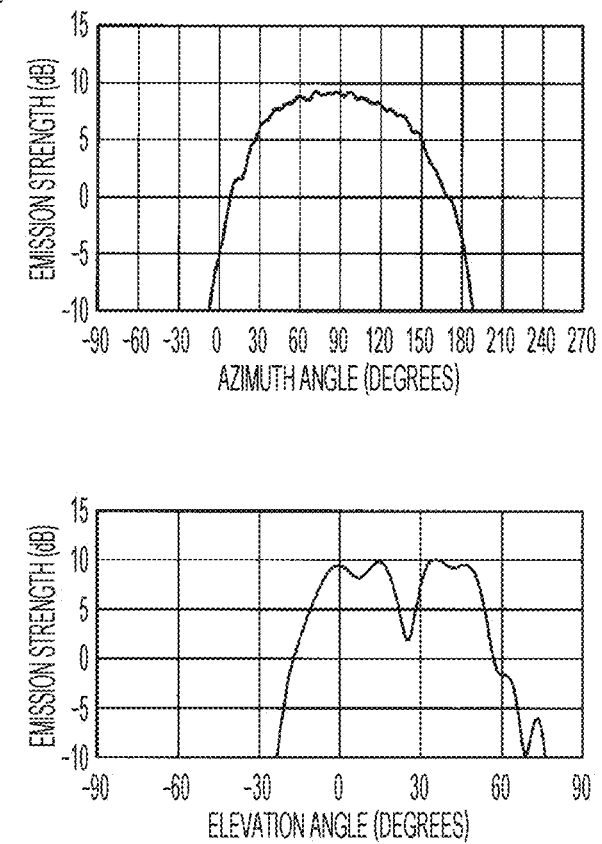

FIGS. 12A to 12C illustrate simulation results for emission strength of the detection device 100. In FIGS. 12A to 12C, the characteristics of emission strength (in dB) with respect to the azimuth angle in a plane with an elevation angle of 10 degrees are illustrated at the upper portion and the characteristics of emission strength with respect to the elevation angle in an XZ plane are illustrated at the lower portion. An XZ plane is a plane with an azimuth angle of 90 degrees.

FIGS. 11A and 12A illustrate emission strength for a simulation model for which the radius vector R of the curved portion 131 is 7.5 mm and the angle θ of the V shape of the reflector 130 is 120 degrees. FIGS. 11B and 12B illustrate emission strength for a simulation model for which the radius vector R of the curved portion 131 is 7.5 mm and the angle θ of the V shape of the reflector 130 is 150 degrees. FIGS. 11C and 12C illustrate emission strength in simulation results for the detection device 50 for comparison purposes.

When FIGS. 11A and 12A as well as FIGS. 11B and 12B are compared with FIGS. 11C and 12C, it is found for the azimuth angle that emission strength was improved in a range from 40 degrees to 50 degrees and in a range from 130 degrees to 140 degrees. Since the detection device 100 is disposed in the interior of the rear bumper of a vehicle at the center in the width direction of the vehicle, the range of the azimuth angle from 40 degrees to 50 degrees and the range of the azimuth angle from 130 degrees to 140 degrees are respectively equivalent to a lower left direction and lower right direction of the rear bumper of the vehicle. The range of the azimuth angle from 40 degrees to 50 degrees and the range of the azimuth angle from 130 degrees to 140 degrees are each a wide-angle range in angles at which radio waves that are emitted from the antenna 121 and are reflected by the reflector 130 propagate in an XY plane, the wide-angle range being a range of wide angles with respect to the direction at an azimuth angle of 90 degrees. The direction at an azimuth angle of 90 degrees is the direction in which the front of the reflector 130 is oriented. The wide-angle range is a range in which angles with respect to direction of the orientation of the front of the reflector 130 are relatively large.

As for characteristics for the elevation angle, the detection device 100 and the detection device 50 for comparison purposes exhibited much the same emission strength, as seen from the characteristics at the lower portion in FIGS. 12A, 12B, and 12C.

Therefore, it was found that the detection device 100 can cause a reflected wave to reach a farther distance in a lower left direction and lower right direction of the rear bumper of the vehicle, when compared with the detection device 50 for comparison purposes. The detection device 100 can detect the toes of the user in a wider range in the left-right direction.

Figure 13A:
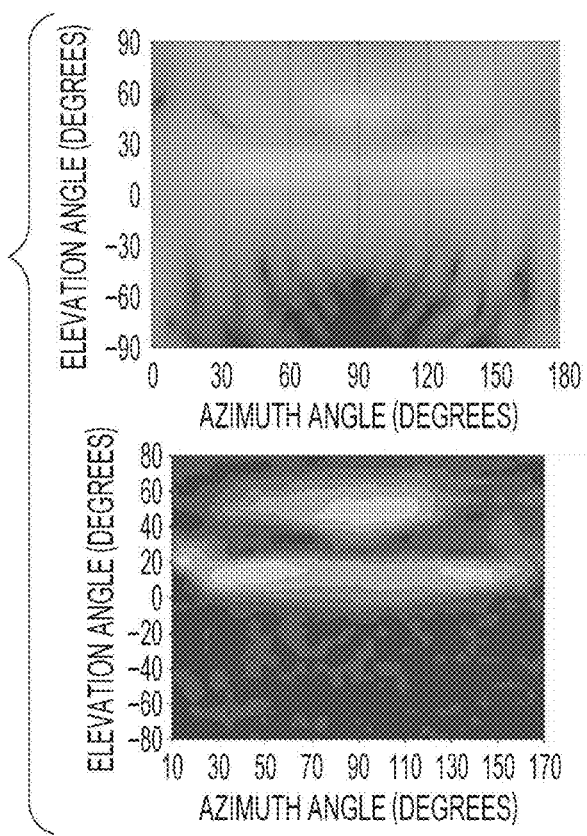
Figure 13C:
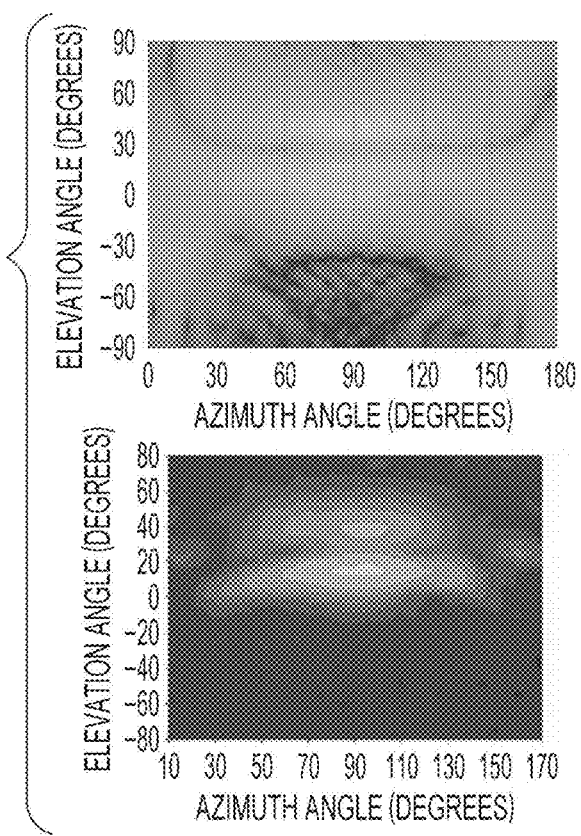

FIGS. 13A to 13C illustrate emission strength of the detection device 100. In FIGS. 13A to 13C, for comparison of actual measurement results with simulation results, the simulation results in FIGS. 11A to 11C are illustrated at the upper portion and the actual measurement results are illustrated at the lower portion.

In FIGS. 13A to 13C, the horizontal axis indicates the azimuth angle (in degrees) and the vertical axis indicates the elevation angle (in degrees). FIGS. 13A to 13C represent that the brighter the color is, the higher emission strength is and that the darker the color is, the lower emission strength is.

Figure 14A:
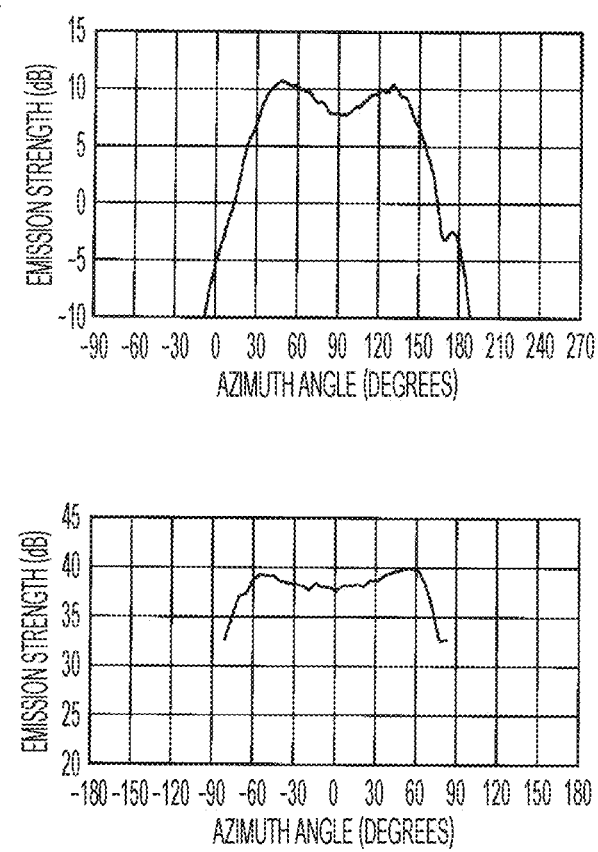
Figure 14C:
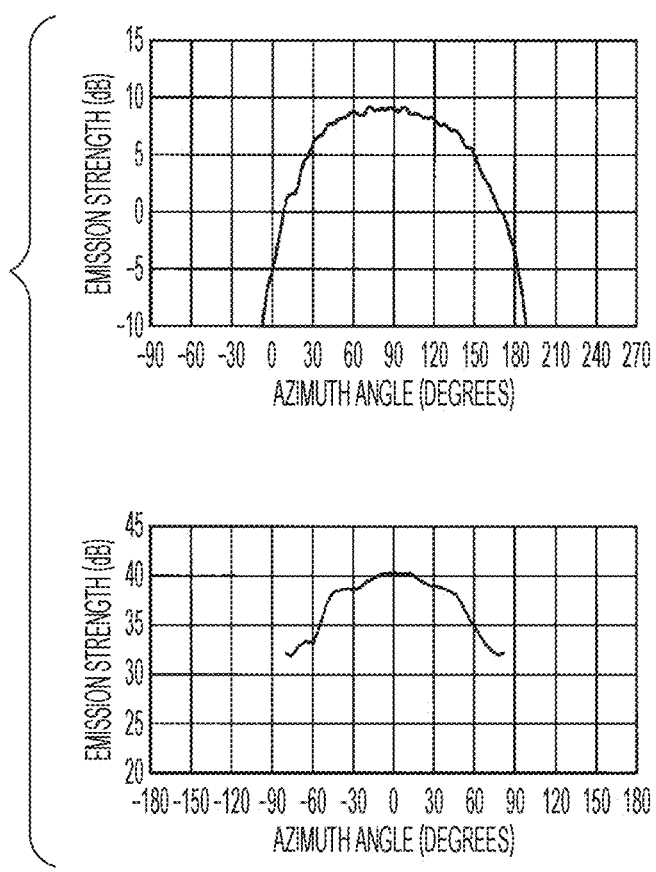

FIGS. 14A to 14C illustrate actual measurement results for the characteristics of emission strength with respect to the azimuth angle of the detection device 100. In FIGS. 14A to 14C, for comparison of actual measurement results with simulation results, the simulation results, in FIGS. 12A to 12C, of the characteristics of emission strength with respect to the azimuth direction of the detection device 100 are illustrated at the upper portion and the actual measurement results are illustrated at the lower portion. The actual measurement results are the characteristics of emission strength with respect to the azimuth direction in a plane with an elevation angle of 10 degrees, as with the simulation results.

FIGS. 13A and 14A illustrate emission strength for the detection device 100 for which the radius vector R of the curved portion 131 is 7.5 mm and the angle θ of the V shape of the reflector 130 is 120 degrees. FIGS. 13B and 14B illustrate emission strength for the detection device 100 for which the radius vector R of the curved portion 131 is 7.5 mm and the angle θ of the V shape of the reflector 130 is 150 degrees. FIGS. 13C and 14C illustrate emission strength for the detection device 50 for comparison purposes.

From a comparison between the simulation results at the upper portion in FIGS. 13A to 13C and the actual measurement results at the lower portion, it could be confirmed that the simulation results and actual measurement results are similar in the detection device 100 with the angle θ of the V shape being 120 degrees, the detection device 100 with the angle θ of the V shape being 150 degrees, and the detection device 50 for comparison purposes.

From a comparison between the actual measurement results in FIGS. 13A and 14A as well as FIGS. 13B and 14B and the actual measurement results in FIGS. 13C and 14C, it is found that emission strength was improved in a range from 40 degrees to 50 degrees and in a range from 130 degrees to 140 degrees.

From these actual measurement results, it could be confirmed that the detection device 100 can cause a reflected wave to reach a farther distance in a lower left direction and lower right direction of the rear bumper of the vehicle, when compared with the detection device 50 for comparison purposes. It could also be confirmed that the detection device 100 can detect the toes of the user in wider ranges in the left-right direction and can operate the electric opener in wider ranges in the left-right direction.

Figure 15:
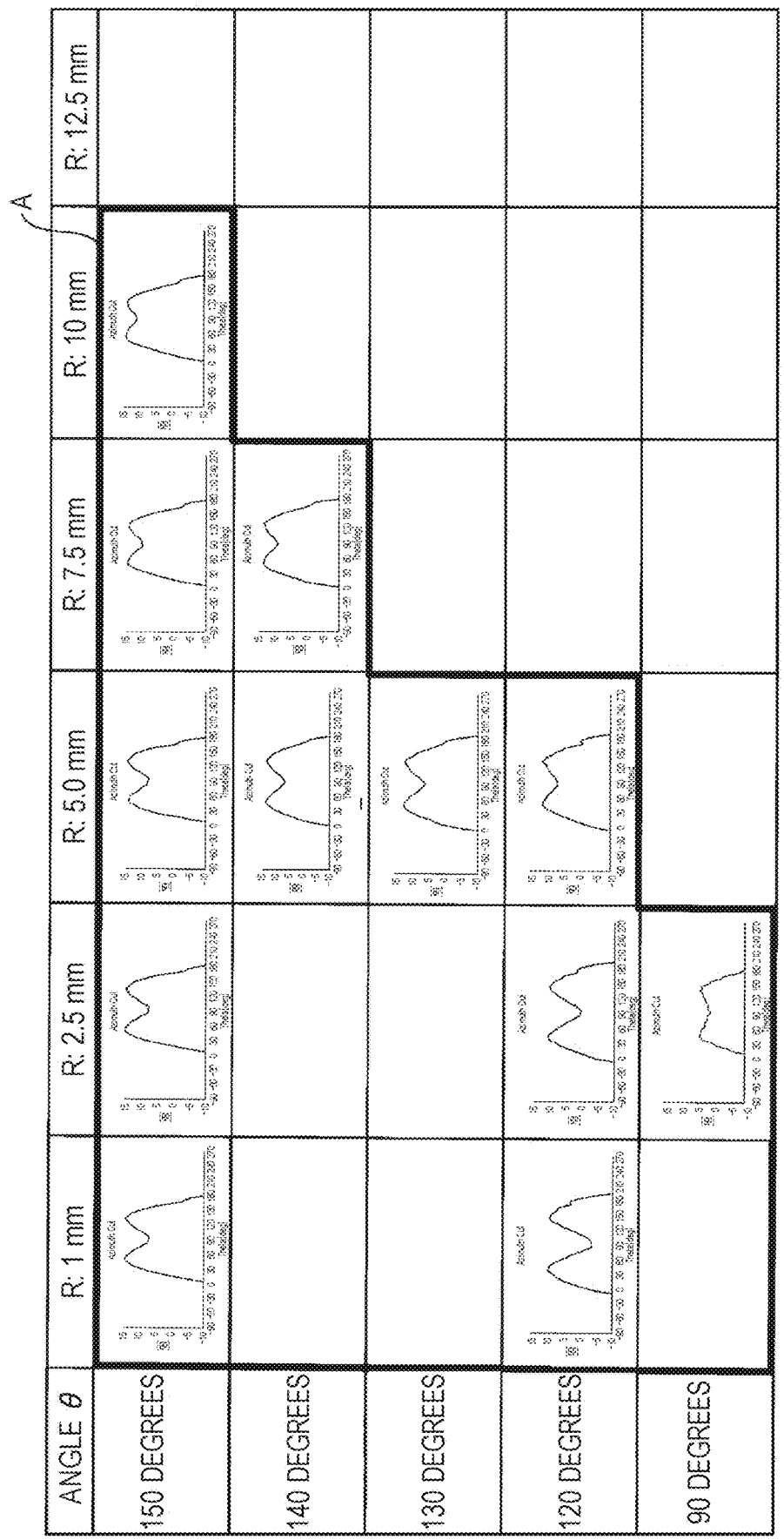
FIG. 15 illustrates simulation results obtained in combinations of various radius vectors and the angles of various V shapes.

FIG. 15 illustrates simulation results obtained in combinations of various radius vectors R and the angle θ of various V shapes. In FIG. 15, simulation results of the characteristics of emission strength with respect to the azimuth angle in a plane with an elevation angle of 10 degrees are illustrated. The radius vector R was set to 1 mm, 2.5 mm, 5.0 mm, 7.5 mm, and 10 mm. The angle θ of the V shape was set to 150 degrees, 140 degrees, 130 degrees, 120 degrees, and 90 degrees.

In combinations in the range enclosed by bold lines A, emission strength was higher than the emission strength of the detection device 50 for comparison purposes (see the characteristics at the upper portion in FIG. 12C) in wide-angle ranges such as a range of azimuth angles of 40 degrees to 50 degrees, the range being equivalent to the lower-left direction of the rear bumper of the vehicle, and a range of azimuth angles of 130 degrees to 140 degrees, the range being equivalent to the lower-right direction of the rear bumper. Each blank in the range enclosed by the bold lines A indicates a combination for which simulation was not performed. Characteristics for combinations outside the range enclosed by the bold lines A will be omitted here.

Figure 16A:
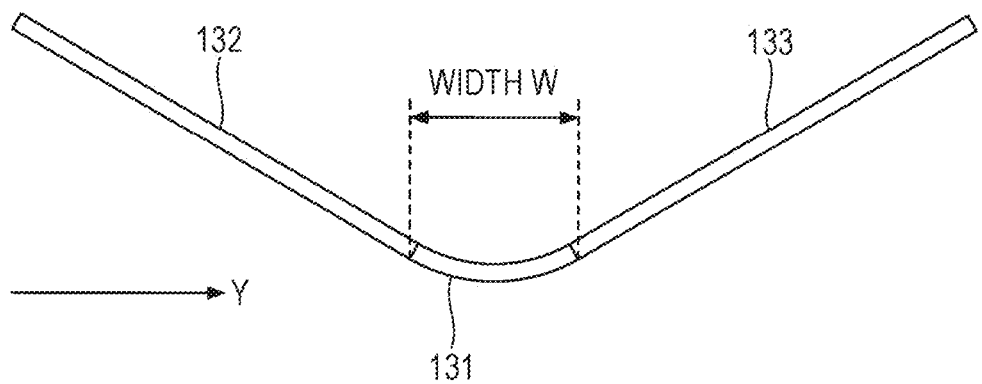
FIG. 16A illustrates the width of the curved portion.
Figure 16B:
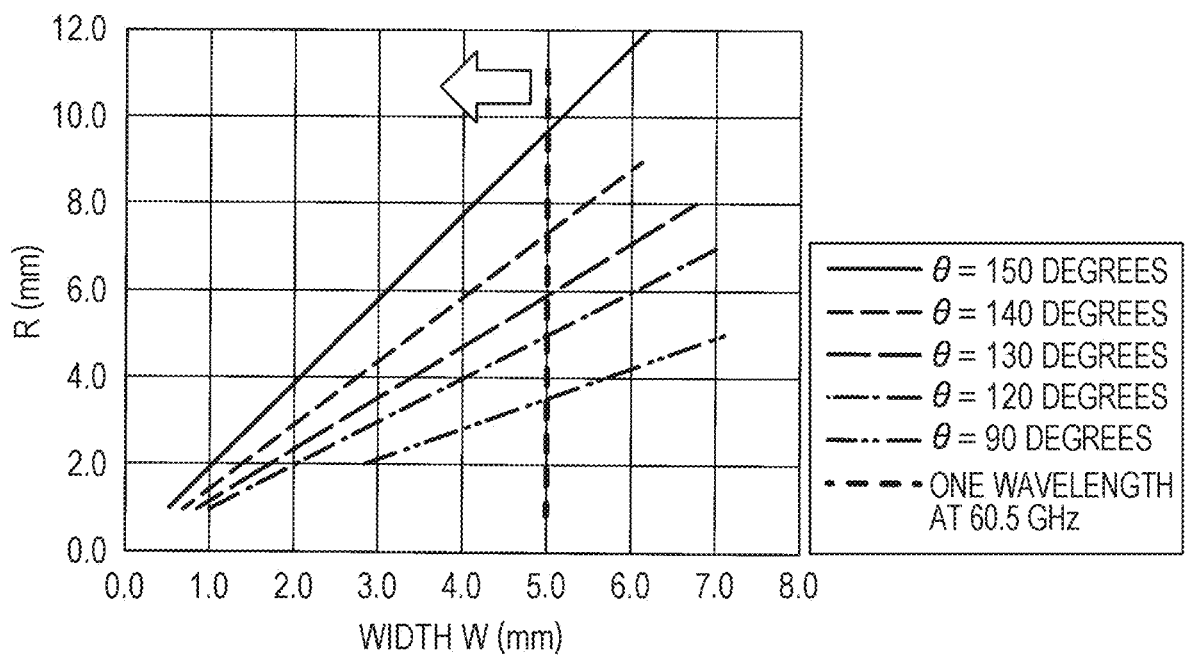
FIG. 16B illustrates a relationship between the width and the radius vector.

FIG. 16A illustrates the width W of the curved portion 131, and FIG. 16B illustrates the relationship between the width W and the radius vector R. As illustrated in FIG. 16A, the width W of the curved portion 131 will be represented by the length of a segment in which the curved portion 131 is present in the Y direction. When this type of the width W was used, the combinations in the range enclosed by the bold lines A in FIG. 15 were combinations in which the width W was shorter than or equal to one wavelength of a radio wave at the communication frequency of the transmission and reception device 120.

As illustrated in FIG. 16B, in the relationship between the width W and the radius vector R, the radius vector R tends to increase along with an increase in the width W as the angle θ of the V shape becomes larger. When the width W is 5 mm at 60.5 GHz, the width W is equivalent to one wavelength. The relationship between the radius vector R and the width W on the left side with respect to the bold line at the width W of 5 mm represents a combination of the width W and radius vector R in which emission strength was increased on the wide-angle ranges. Therefore, to design the curved portion 131 by which the width W becomes shorter than or equal to one wavelength of a radio wave at 60.5 GHz, which is the communication frequency of the transmission and reception device 120, it is only necessary to combine the radius vector R with the width W that is, for example, shorter than or equal to 5 mm in FIG. 16B.

In wide-angle ranges such as a range in which azimuth angles are from 40 degrees to 50 degrees and a range from 130 degrees to 140 degrees, it was not recognized that emission strength becomes higher when compared with the detection device 50 for comparison purposes when the width W was longer than one wavelength of a radio wave at the communication frequency of the transmission and reception device 120, when the angle θ of the V shape was greater than 150 degrees, and when the angle θ of the V shape was smaller than 90 degrees.

A reason for this result is that: when the width W is shorter than or equal to one wavelength, the curved portion 131 is narrow, so radio waves are likely to be reflected at the flat plate portions 132 and 133 and the reflected waves are likely to expand toward wide-angle ranges; however when the width W is longer than one wavelength, more radio waves are reflected at the curved portion 131 and less radio waves are reflected toward wide-angle ranges by the flat plate portions 132 and 133, so the strength of radio waves in the wide-angle ranges is lowered. Another reason is that when the angle θ of the V shape is smaller than or equal to 90 degrees, radio waves reflected at the flat plate portions 132 and 133 are directed to the −X direction rather than to the +X direction, so the strength of radio waves reflected toward the wide-angle ranges is lowered. Yet another reason is that when the angle θ of the V shape is greater than or equal to 150 degrees, even when the width W is shorter than or equal to one wavelength, the curved portion 131 approaches a flat surface, so the strength of radio waves reflected toward the wide-angle ranges is lowered.

From these reasons, it was found that, to increase emission strength in wide-angle ranges such as a range of azimuth angles of 40 degrees to 50 degrees, the range being equivalent to the lower-left direction of the rear bumper of the vehicle, and a range of azimuth angles of 130 degrees to 140 degrees, the range being equivalent to the lower-right direction of the rear bumper, the angle θ of the V shape is preferably greater than or equal to 90 degrees and the width W of the curved portion 131 is preferably shorter than or equal to one wavelength of a radio wave at the communication frequency of the transmission and reception device 120.

As described above, the reflector 130 has the curved portion 131 and flat plate portions 132 and 133. The curved portion 131 is curved at a certain curvature and protrudes toward the antenna 121 (antenna side). The curved portion 131 has the convexly curved surface 131S that reflects radio waves emitted by the antenna 121. The convexly curved surface 131S has a shape equivalent to a portion on the outer circumferential surface of a cylinder, the portion being the range of a certain azimuth angle φ with respect to the cylindrical axis C. The convexly curved surface 131S is inclined toward the antenna 121 with respect to the upper surface 111 of the circuit board 110.

The flat plate portions 132 and 133 respectively have the surfaces 132S and 133S that reflect radios emitted by the antenna 121. The surfaces 132S and 133S extend from both sides of the convexly curved surface 131S, one surface from each side, in the circumferential direction along the upper surface 111 of the circuit board 110, and form a V shape together with the convexly curved surface 131S. The convexly curved surface 131S and surfaces 132S and 133S form the reflecting surfaces of the reflector 130.

This type of reflector 130, which is composed of the curved portion 131 having the convexly curved surface 131S and the flat plate portions 132 and 133 having the surfaces 132S and 133S, has a simple structure and is easy to design.

Therefore, it is possible to provide the antenna device 100A and detection device 100 having the reflector 130, which has a simple structure and is easy to design. It is also possible to provide an opening/closing unit control system and an occupant detection system that include the antenna device 100A and detection device 100 having the reflector 130, which has a simple structure and is easy to design. Since the reflector 130, which has a simple structure and is easy to design, is included, the reach distance of a radio wave reflected at the reflector 130 can be reliably prolonged in desired directions as in ranges of the wide-angle ranges described above.

The convexly curved surface 131S may be inclined with respect to the circuit board 110 so that at least part of the convexly curved surface 131S overlaps the antenna 121 in plan view. Therefore, radio waves emitted by the antenna 121 can be reliably reflected at the reflector 130 and radio waves reflected at the detection target can be reliably reflected at the reflector 130 toward the antenna 121.

The convexly curved surface 131S may be continuous to the surface 132S and may also be continuous to the surface 133S. Therefore, radio waves emitted by the antenna 121 and radio waves reflected at the detection target can be evenly reflected. Also, the reflector 130 can be more easily designed and manufactured.

The curved portion 131 may have a shape in which a flat plate is curved. Therefore, the curved portion 131 can be more easily designed and manufactured.

The flat plate may have the flat plate portions 132 and 133 at both ends of a portion forming the curved portion 131, one plate portion at each end. Therefore, the reflector 130 can be more easily designed and manufactured.

The width W of the curved portion 131 in the Y-axis direction, which is an example of a one-axis direction in which the curved portion 131 and flat plate portions 132 and 133 are arranged in plan view, may be shorter than or equal to one wavelength of a radio wave at the communication frequency of the antenna. Therefore, the reach distance of a radio wave reflected at the reflector 130 can be reliably prolonged in wide-angle ranges.

The angle formed by the surfaces 132S and 133S may be greater than or equal to 90 degrees in plan view. Therefore, the reach distance of a radio wave reflected at the reflector 130 can be reliably prolonged in wide-angle ranges.

The antenna 121 may be of a type that doubles as a transmission antenna for transmitting radio waves and a reception antenna for receiving radio waves. Therefore, transmission and reception can be performed with a single antenna 121. Therefore, the reflector 130 can be more easily designed and manufactured.

The antenna 121 may have a transmission antenna 121A for transmitting radio waves and a reception antenna 121B for receiving radio waves. The transmission antenna 121A and reception antenna 121B may be placed side by side, as shown in FIG. 2B. Therefore, the reflector 130 can be more easily designed and manufactured in a structure in which different antennas are used as a transmission antenna and a reception antenna.

The detection device 100 includes the antenna device 100A, the transmission circuit 122, and the reception circuit 123, as well as the control unit 124, which functions as a detection unit that detects at least one of the presence of the detection target and its behavior according to a signal received by the reception circuit 123. Since this type of detection device 100 includes the reflector 130 composed of the curved portion 131 having the convexly curved surface 131S and the flat plate portions 132 and 133 having the surfaces 132S and 133S, the structure of the detection device 100 is simple and it can be easily designed.

The transmission circuit 122 and reception circuit 123 may be integrally formed in an integrated circuit. Therefore, it is possible to provide the detection device 100 with a simple structure.

The antenna 121 and the integrated circuit that implements the transmission circuit 122 and reception circuit 123 may be integrally formed. Therefore, it is possible to provide the detection device 100 with a simpler structure.

The detection device 100 may further include the lower case 10 and upper case 20 that form a cabinet having an attachment portion by which the cabinet is attached at a lower portion of a door of the vehicle, inside the bumper of the vehicle, or in the interior of the room of the vehicle. The antenna device 100A, the transmission circuit 122, the reception circuit 123, and the control unit 124, which functions as the detection unit, may be stored in the lower case 10 and upper case 20. Therefore, it is possible to provide the detection device 100 in which the reflector 130, which is easy to design, is packaged.

The control unit 124, which functions as the detection unit, may detect at least one of the presence and behavior of the manipulator in the vicinity of the vehicle. Therefore, it is possible to provide the detection device 100 that can be used as a device that detects the operation of an electric opener for an opening/closing portion of a vehicle.

An aspect has been described above in which the curved portion 131 and flat plate portions 132 and 133 of the reflector 130 are manufactured by bending a metal plate in a flat-plate shape, as an example. However, the reflector 130 is not limited to a reflector manufactured by bending a metal plate in a flat-plate shape, and may be resinous. When the reflector 130 is resinous, it may be manufactured by plastic molding. Also, the reflector 130 is not limited to a reflector manufactured by bending a flat plate as described above. If the reflector 130 is an object that has the convexly curved surface 131S and surfaces 132S and 133S, the reflector 130 may have any shape. For example, the reflector 130 may be of box type or the like.

An aspect has been described above in which the transmission and reception device 120 has the antenna 121 that can perform transmission and reception. However, the antenna 121 may have a structure in which the antenna 121 has a transmission antenna that transmits radio waves and a reception antenna that receives radio waves, and the transmission antenna and reception antenna are arranged side by side.

An aspect has been described above in which the transmission and reception device 120 has the antenna 121. However, the antenna 121 may be disposed separately from the transmission and reception device 120. An aspect has been described above in which the transmission and reception device 120 has the transmission circuit 122, reception circuit 123, and control unit 124. However, the transmission circuit 122, reception circuit 123, and control unit 124 may be disposed separately from one another, or a combination of the transmission circuit 122 and reception circuit 123 may be separated from the control unit 124.

An aspect has been described above in which the flat plate portions 132 and 133 have a symmetric shape (plane symmetry) in which they are mutual mirror images with respect to a plane that includes the straight line 131B of the curved portion 131 and is parallel to an XZ plane. However, if the surface 132S of the flat plate portion 132 and the surface 133S of the flat plate portion 133 form a V shape in plan view and are inclined at the angle α when the cross sections of the flat plate portions 132 and 133 as taken along a plane parallel to an XZ plane are viewed, the flat plate portions 132 and 133 may have mutually different shapes.

This completes the description of the antenna device, detection device, opening/closing unit control system, and occupant detection system in an exemplary embodiment of the present invention. However, the present invention is not limited to specifically disclosed embodiments, but can be varied and modified in various other ways without departing from the scope of the claims.

What is claimed is:

1. An antenna device comprising:
a substrate;
an antenna provided on a surface of the substrate; and
a reflector formed of a curved portion and a pair of first and second flat portions, the reflector being configured to reflect a radio wave emitted by the antenna, the reflector standing on the surface of the substrate and extending along the surface, the curved portion having a convexly curved surface protruding toward the antenna; the first flat portion having a first reflecting surface extending from one side of the convexly curved surface along the surface of the substrate to a first end of the reflector; and the second flat portion having a second reflecting surface extending from other side of the convexly curved surface opposite to the one side along the surface of the substrate to a second end of the reflector opposite to the first end, the first and second reflecting surfaces together with the convexly curved surface forming an entire reflector surface having a V-shape in a plan view from above the surface of the substrate,
wherein the convexly curved surface has a shape equivalent to a portion of a curved surface of a cylinder having a radius and a cylindrical axis, the convexly curved surface corresponding to a range of an azimuth angle with respect to the cylindrical axis,
and wherein the convexly curved surface is inclined with respect to the surface of the substrate, such that the convexly curved surface leans toward the antenna, and is not curved in a direction parallel to the cylindrical axis.

2. The antenna device according to claim 1, wherein the convexly curved surface is inclined with respect to the substrate such that at least part of the convexly curved surface overlaps the antenna in the plan view.

3. The antenna device according to claim 1, wherein the convexly curved surface is continuous to the first reflecting surface and to the second reflecting surface.

4. The antenna device according to claim 1, wherein the curved portion is formed as a radially bent portion by radially bending a flat plate.

5. The antenna device according to claim 4, wherein the flat plate includes the first flat portion and the second flat portion at both sides of a portion which is to form the radially bent portion.

6. The antenna device according to claim 1, wherein a width of the curved portion, which is a distance between the one side and the other side of the convexly curved surface, is shorter than or equal to a wavelength of the radio wave at a communication frequency of the antenna.

7. The antenna device according to claim 1, wherein an angle formed by the first reflecting surface and the second reflecting surface is greater than or equal to 90 degrees in the plan view.

8. The antenna device according to claim 1, wherein the antenna is a single antenna configured to perform radio wave transmission as a transmission antenna and to perform radio wave reception as a reception antenna.

9. The antenna device according to claim 1, wherein the antenna includes a transmission antenna for performing radio wave transmission and a reception antenna for performing radio wave reception, the transmission antenna and the reception antenna being disposed adjacent to each other in a direction along the surface of the substrate.

10. A detection device comprising:
   the antenna device according to claim 1;
   a transmission circuit configured to output a transmission signal to the antenna, whereby the antenna emits the radio wave as a transmission radio wave;
   a reception circuit configured to receive a detection signal corresponding to a reflected radio wave received by the antenna, the reflected radio wave being the transmission radio wave reflected by a detection target; and
   a detection unit configured to detect at least one of presence and behavior of the detection target according to the detection signal received by the reception circuit.

11. The detection device according to claim 10, wherein the transmission circuit and the reception circuit are integrally formed in an integrated circuit provided on the substrate.

12. The detection device according to claim 11, wherein the antenna and the integrated circuit are integrally formed.

13. The detection device according to claim 10, further comprising:
   a casing having an attachment portion configured to attach the casing to a lower portion of a door of a vehicle, an inside of a bumper of the vehicle, or an interior of the vehicle,
   wherein the antenna device, the transmission circuit, the reception circuit, and the detection unit are accommodated in the casing.

14. The detection device according to claim 13, wherein the detection unit detects at least one of presence and behavior of a toe of a vehicle operator in a vicinity of the vehicle.

15. A system for controlling opening/closing of an opening/closing part of a vehicle, the system comprising:
   the detection device according to claim 14; and
   a control unit configured to control opening and closing of the opening/closing part of the vehicle according to a result of detection by the detection unit.

16. A system for detecting an occupant in a vehicle, the system comprising:
   the detection device according to claim 13; and
   an occupant detection unit configured to determine presence or absence of an occupant in a vehicle compartment according to a result of detection by the detection unit of the detection device.

17. An antenna device comprising:
   a substrate;
   an antenna provided on a surface of the substrate; and
   a reflector configured to reflect a radio wave emitted by the antenna, the reflector standing on the surface of the substrate and extending along the surface, the reflector including: a curved portion having a convexly curved surface protruding toward the antenna; a first flat portion having a first reflecting surface extending from one side of the convexly curved surface along the surface of the substrate; and a second flat portion having a second reflecting surface extending from other side of the convexly curved surface opposite to the one side along the surface of the substrate, the first and second reflecting surfaces together with the convexly curved surface forming a V-shape in a plan view from above the surface of the substrate,
   wherein the convexly curved surface has a shape equivalent to a portion of a curved surface of a cylinder having a radius and a cylindrical axis, the convexly curved surface corresponding to a range of an azimuth angle with respect to the cylindrical axis,
   and wherein the convexly curved surface is inclined with respect to the surface of the substrate, such that the convexly curved surface leans toward the antenna, and is not curved in a direction parallel to the cylindrical axis,
   wherein a width of the curved portion, which is a distance between the one side and the other side of the convexly curved surface, is equal to or smaller than a wavelength of the radio wave at a communication frequency of the antenna and is equal to or greater than one fifth of the wavelength.

\* \* \* \* \*